(12) United States Patent
Hisano et al.

(10) Patent No.: US 7,104,114 B2
(45) Date of Patent: Sep. 12, 2006

(54) ELECTRONIC EQUIPMENT AND FUEL CELL FOR THE SAME

(75) Inventors: Katsumi Hisano, Kashiwa (JP); Eiichi Sakaue, Tokyo (JP); Nobutaka Kikuiri, Koganei (JP); Tomonao Takamatsu, Tokyo (JP); Hideo Iwasaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 217 days.

(21) Appl. No.: 10/776,289

(22) Filed: Feb. 12, 2004

(65) Prior Publication Data

US 2004/0161642 A1  Aug. 19, 2004

(30) Foreign Application Priority Data

Feb. 14, 2003  (JP) .............................. 2003-037118

(51) Int. Cl.
*G01M 3/04* (2006.01)
(52) U.S. Cl. ........................................... 73/40.7; 73/40
(58) Field of Classification Search ................ 73/40.7, 73/40
See application file for complete search history.

(56) References Cited

U.S. PATENT DOCUMENTS 3,485,085 A * 12/1969 Hawkins, Jr. .................. 73/46
6,175,310 B1 * 1/2001 Gott ........................... 340/605
6,808,837 B1 * 10/2004 Hirsch ......................... 429/34

FOREIGN PATENT DOCUMENTS

| JP | 10-254360 |   | 9/1998 |
| JP | 2000-106596 | * | 4/2000 |
| JP | 2002-232176 |   | 8/2002 |
| KR | 2001-0039446 |   | 5/2001 |
| KR | 2003-0092387 |   | 12/2003 |

* cited by examiner

*Primary Examiner*—Daniel S. Larkin
(74) *Attorney, Agent, or Firm*—Oblon, Spivak, McClelland, Maier & Neustadt, P.C.

(57) ABSTRACT

An electronic equipment is provided with a fluid device using fluid including an additive, a main body comprising an installation site for installation of the fluid device and a detection part reserving the fluid. The detection part makes the fluid visible by means of the additive or is provided with a detection substance changing its nature when contacting the fluid, thereby leakage of the fluid is detected. The detection part may be further provided with electrodes to measure an electric property change therebetween. The detection part is disposed on either the installation site or the fluid device.

4 Claims, 7 Drawing Sheets

ELECTRONIC EQUIPMENT AND FUEL CELL FOR THE SAME

CROSS-REFERENCE TO RELATED APPLICATIONS

This application is based upon and claims the benefit of priority from the prior Japanese Patent Application No. 2003-037118 (filed on Feb. 14, 2003); the entire contents of which are incorporated herein by reference.

BACKGROUND OF THE INVENTION

1. Field of the Invention

The invention relates to an electronic equipment with a fluid leakage detection unit and, more particularly, relates to an electronic equipment using a fluid device, such as a fuel cell or a fluid cooling system, with a fluid leakage detection unit for leakage detection of the fluid used in the fluid device.

2. Description of the Related Art

Recently, it is diligently considered that an application of a fuel cell to a power source of a portable electronic equipment, such as a cellular phone, a notebook type PC and such, is diligently being studied. As such, a fuel cell, a direct methanol fuel cell (DMFC, hereinafter), in which methanol aqueous solution is directly used as a fuel for power generation, is now considered to be preferable.

A DMFC unit is, in general, provided with a fuel cell for reaction, a fuel tank for housing the methanol aqueous solution as a fuel and supplying the fuel to the fuel cell and flow paths interconnecting the fuel cell, the fuel tank and such. Whole of the DMFC unit may be either housed in the electronic equipment or attached to an outside of the electronic equipment.

A fuel cell unit housed in or attached to the electronic equipment may be subject to severe impact causing leakage of the fuel because the electronic equipment often drops to the ground or a floor during carrying or use.

Furthermore, the electronic equipment may be provided with a water cooling system for cooling electronic devices housed therein. The water cooling system may also have risk for leakage of water therein.

For prevention of undesired problem caused by fluid leakage, there is a proposed art disclosed in Japanese Patent Application laid-open No. 2002-232176, in which a water cooling system for cooling semiconductor devices is covered by water-absorbing material.

SUMMARY OF THE INVENTION

According to the aforementioned proposed art, provided that any evidence of fluid leakage is found during a process of maintenance, it can be not estimated where the fluid came. For example, external water may intrude into the electronic equipment so as to leave the evidence. To proceed a proper maintenance of the electronic equipment, it is important to estimate whether the fluid came from a fluid device housed therein or the outside thereof.

The present invention is intended for providing an electronic equipment with a detection unit detecting fluid leakage distinguishably from external fluid intrusion.

According to a first aspect of the invention, an electronic equipment is provided with a fluid device using fluid including an additive, a main body comprising an installation site for installation of the fluid device and a detection part configured to reserve leaked fluid to make the leaked fluid visible with the additive and disposed on the installation site whereby leakage of the fluid is detected.

According to a second aspect of the invention, an electronic equipment is provided with a fluid device using fluid, a main body comprising an installation site for installation of the fluid device and a detection part comprising a detecting substance changing its nature when contacting the fluid, the detection part being disposed on the installation site, whereby leakage of the fluid is detected.

According to a first aspect of the invention, an electronic equipment is provided with a fluid device using fluid including an additive, a main body comprising an installation site for installation of the fluid device and a detection part configured to contain leaked fluid to make the leaked fluid visible with the additive and disposed on the installation site whereby leakage of the fluid is detected.

According to a fourth aspect of the invention, an electronic equipment is provided with a main body, a fluid device using fluid, the fluid device being attached to the main body and a detection part comprising a detecting substance changing its nature when contacting the fluid, the detection part being disposed on the installation site, whereby leakage of the fluid is detected.

According to a fifth aspect of the invention, a fuel cell unit is provided with a fuel cell main body, a fuel tank supplying fuel including an additive to the fuel cell main body, a casing housing the fuel cell main body and the fuel tank and one or more detection parts containing leaked fuel configured to make the leaked fuel visible by means of the additive whereby leakage of the fuel is detected, the detection part being disposed on at least one element selected from the group of the fuel cell main body, the fuel tank and the casing.

DETAILED DESCRIPTION OF THE INVENTION

Figure 1:
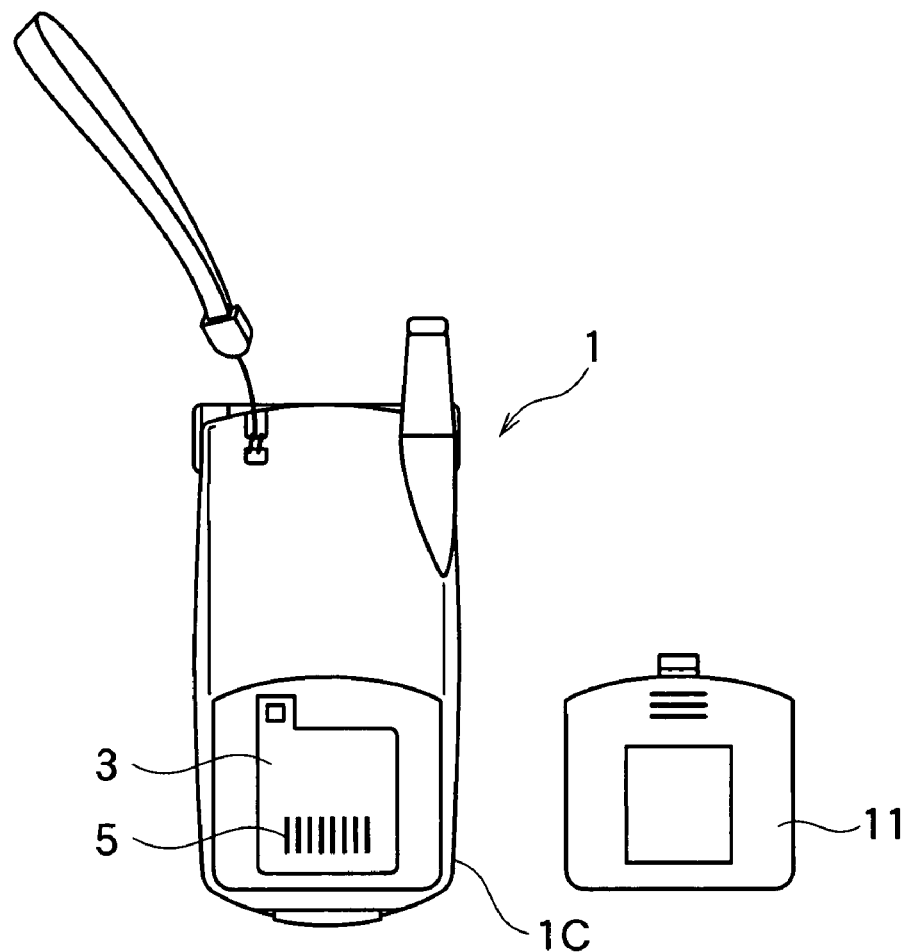
FIG. 1 is a rear view of a cellular phone as an example of an electronic equipment, where a lid of a battery housing is removed.

Embodiments of the present invention will be described hereinafter with reference to the accompanying drawings. FIG. 1 shows a cellular phone as an example of the electronic equipment, however, applications of the present invention are not limited to such a cellular phone and can be applied to various portable electronic equipments, notebook type PC and such.

A casing 1C of an electronic equipment main body 1 is provided with an installation site 3 for installation of a fluid device, a fuel cell (not shown) in this case. A direct methanol fuel cell (DMFC hereinafter) is preferably applied to such a fuel cell. As well, a reform-type fuel cell, which is provided with a reformer for extracting hydrogen from fuel, or any fuel cell utilizing liquid fuel can be applied to such a fuel cell.

Meanwhile, in a case of a notebook type PC provided with a water cooling system, the water cooling system can be regarded as the fluid device and a housing thereof can be regarded as the installation site 3.

Figure 2:
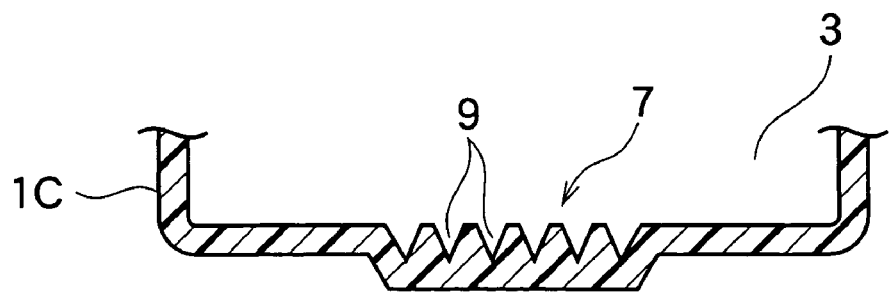
FIG. 2 is a sectional view of a leakage containing structure for leakage detection according to a first embodiment of the present invention.

The installation site 3 is provided with fluid leakage detection means 5 for detection of leakage of the fuel or any other fluid. In this example, a leakage containing structure 7 is formed at a bottom of the installation site 3 as shown in FIG. 2.

The leakage containing structure 7 is provided with several narrow grooves 9, according to this example, so as to contain the fluid by means of surface tension thereof. An additives such as a pigment or a dyes is added to the fluid in advance so as to leave a visible residue at the leakage containing structure 7 after the fluid has evaporated. The leakage containing structure 7 is preferably white-colored so as to make the additive in the fluid easily visible. As the additive, a proper pigment or dye which has a color for ease of observation, is soluble in the fluid and becomes a residue when the fluid has evaporated should be selected. "C.1.No.16045 (Daiwa Kasei Co.,Ltd.)" as a red dye, phthalocyanine pigment as a blue pigment and "C.1.acid yellow 7" as a yellow dye can be exemplified as the additive.

The constitution of the leakage containing structure 7 is not limited to the aforementioned structure. For example, one or more recesses or projections which are densely disposed, laid fibers, porous material or proper combination thereof can be preferably applied to the constitution. Namely, any constitution which functions as means for properly containing the fluid leakage can be applied. Additionally, in a case where the grooves or the recesses cause a concern about strength reduction of the casing 1C, the casing 1C in the vicinity of the leakage containing structure 7 may be formed so as to have a thick wall as shown in FIG. 2.

As will be understood from the above description, in a case where the fluid is leaked from the fluid device, the leakage is contained by the leakage containing structure 7 and hence detected by visual observation. When the fluid is colored in advance as mentioned above, the leakage is further easily detected. On an occasion of maintenance of the electronic equipment main body 1, any trouble with the fluid device can be easily recognized and hence brought to be repaired.

Figure 3:
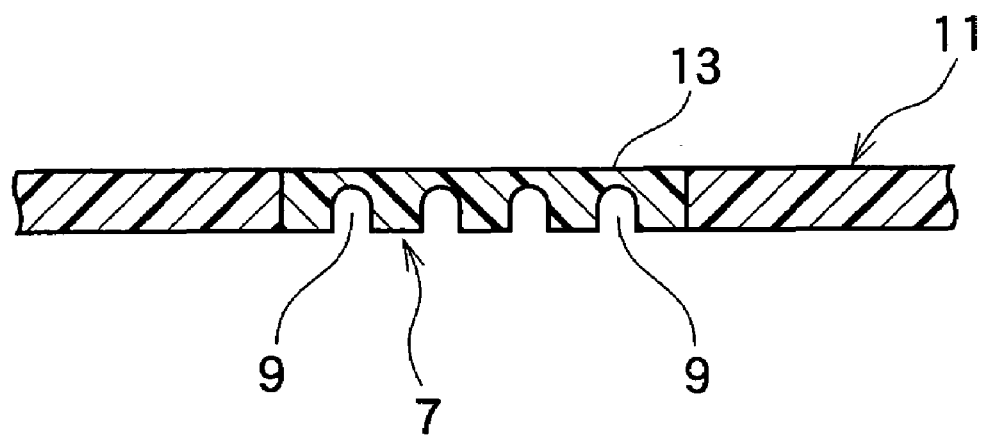
FIG. 3 is a sectional view of a leakage containing structure for leakage detection according to a modification of the first embodiment.

In the aforementioned description, the leakage containing structure 7 is disposed at the bottom of the installation site 3, however, the leakage containing structure 7 may be formed at an inside of a lid portion 11 for covering the installation site 3. In this case, it is preferable that the lid portion 11 partially includes a transparent portion 13 made of transparent resin and such and the leakage containing structure 7 is disposed so as to be visible through the transparent portion 13, as shown in FIG. 3. Then, the leakage of the fluid can be detected from the outside of the electronic equipment main body 1 even when in use and therefore proper treatments, such as switching OFF, can be easily and quickly done.

Figure 4:
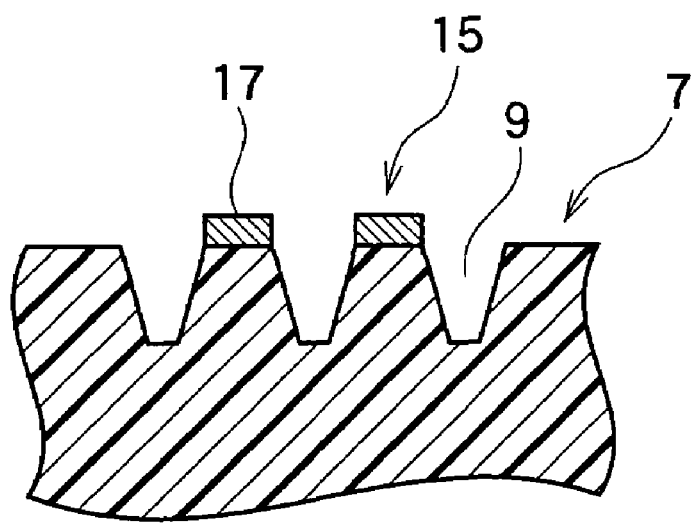
FIG. 4 is a sectional view of a leakage containing structure for leakage detection according to another modification of the first embodiment.

The leakage containing structure 7 may be further provided with a sensor 15 having electrodes 17 so as to electrically detect the leakage of the fluid or intrusion of water from the outside. The electrodes 17 are respectively formed on lands between the grooves 9, as shown in FIG. 4. Electrical properties, such as resistance and capacitance, between the electrodes 17 are measured so that the leakage or the intrusion can be detected.

Figure 5:
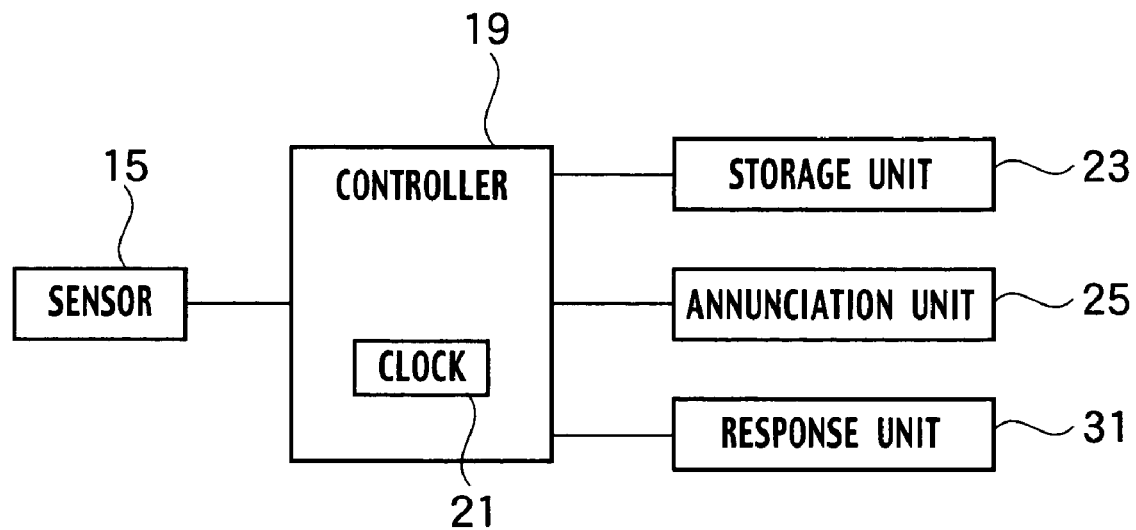
FIG. 5 is a conceptual block diagram for utilizing detected information.

The aforementioned constitution, in which the leakage or the intrusion is electrically detected by the sensor 15, allows that a fact of the detection can be employed for electrical processing. In a case where the electronic equipment main body 1 is provided with a controller unit 19, such as a CPU and a clock 21, a time when the leakage happens can be recorded in a storage unit 23, such as a memory, and a fact of the leakage can be announced to the user by means of an announcement unit 25. FIG. 5 shows a block diagram preferable for such a constitution.

Figure 6:
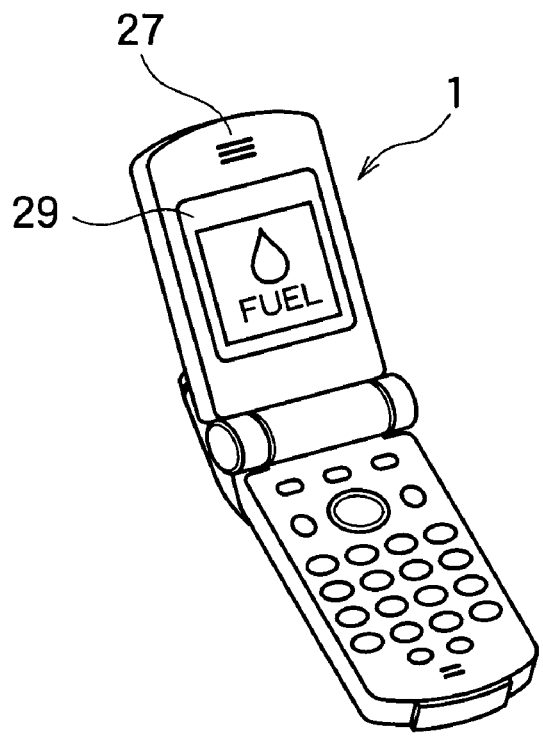
FIG. 6 is an example of indication of fluid leakage.

As the announcement unit 25, a speaker 27, which beeps, or a display unit 29, which displays an alarm message, shown in FIG. 6 may be preferably employed. The announcement unit 25 can promptly give the user a warning of the leakage. Further, in a case where the time when the leakage happens is recorded in the storage unit 23 as mentioned above, such record may give a beneficial information to the maintenance.

Furthermore, the controller unit 19 may be provided with a response unit 31 for proper response to the leakage. The response unit 31, for example, may be so configured as to automatically switch the electronic equipment main body 1 OFF, transmit a mail including an alarm message to a mail address, which may be registered in advance, and proceed such a response.

Figure 7:
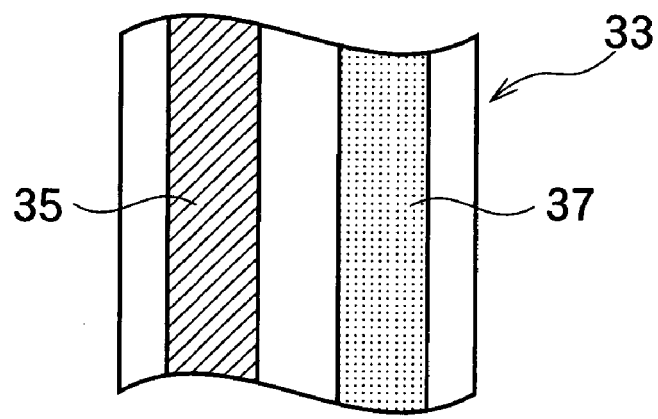
FIG. 7 is a partial plan view of an adhesive tape for leakage detection according to a second embodiment of the present invention.

Still further, an adhesive tape 33 constituted as shown in FIG. 7 may be employed as the fluid leakage detection means 5, which may be adhered to any proper internal place of the electronic equipment main body 1, where the water intrusion or the fluid leakage may happen.

More specifically, the adhesive tape 33 is provided with a water-soluble area 35, which is printed in water-soluble ink, and an alcohol-soluble area 37, which is printed in alcohol-soluble ink. Colors of the water-soluble area 35 and the alcohol-soluble area 37 maybe either identical or different. However, in a case where patterning of the areas are identical, the areas may be preferably colored in different colors.

Figure 8:
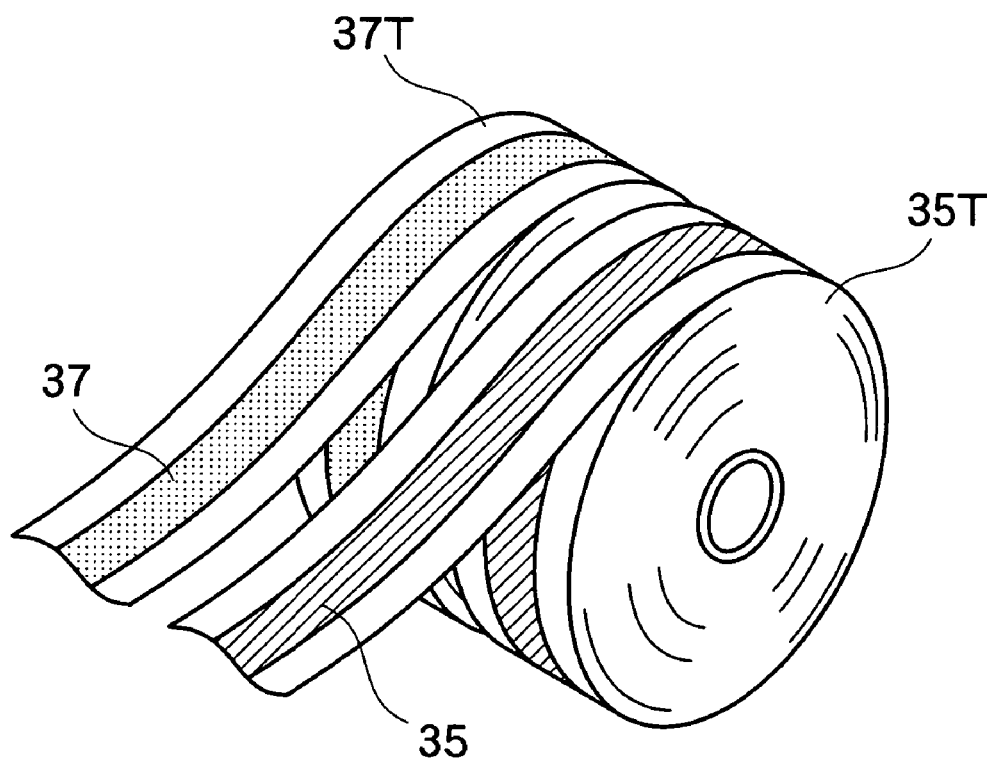
FIG. 8 is a schematic illustration of an adhesive tape for leakage detection in a half-finished product state.
Figure 9A:
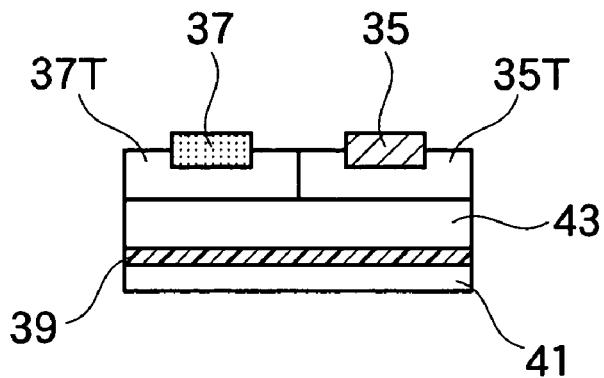
FIG. 9A is a sectional view of an adhesive tape for leakage detection according to a modification of the second embodiment of the present invention.
Figure 9B:
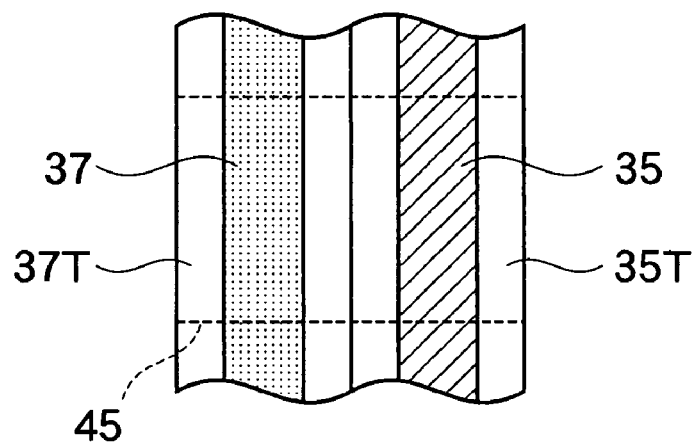
FIG. 9B is a partial plan view of the adhesive tape according to the modification of the second embodiment.

Alternatively, the water-soluble area 35 and the alcohol-soluble area 37 may be respectively printed on two independent adhesive tapes 35T, 37T, as shown in FIG. 8. The two adhesive tapes 35T, 37T may be adhered on a base tape 43 in parallel, as shown in FIGS. 9A, 9B. Adhesive 39 is coated on a backside of the base tape 43 and a peel-off backing paper 41 is adhered further thereon.

The tapes 35T, 37T and 43 are preferably provided with perforated lines 45 at proper even intervals in the longitudinal direction thereof, as shown in FIG. 9B. The perforated lines 45 are preferably formed in an enough depth to separate the tapes 35T, 37T and 43 in the longitudinal direction and do not reach the peel-off backing paper 41.

According to the aforementioned constitution, the adhesive tape 33 as an embodiment of the fluid leakage detection means 5 can be easily adhered to any intended and required place in the electronic equipment main body 1.

In a case where the water intrudes into the electronic equipment main body 1, the water-soluble area 35 blots. In a case where the fluid (the fuel for the fuel cell, which includes alcohol) leaks from the fluid device, the alcohol-soluble area 37 blots. Thereby, it can be easily judged whether the water intrusion occurs or the fluid leakage occurs, by means of a visible check. Therefore, the adhesive tape 33 can be employed as liquid discrimination means for distinguishing between the water intrusion and the fluid leakage.

Instead of the water-soluble area 35, for example, any material which dissolves in the water and chemically or physically changes may be applied. Similarly, instead of the alcohol-soluble area 37, any material which changes its nature when contacting alcohol may be applied. As such material, styrene or polyolefin resin, polyurethane and acrylic rubber or resin can be exemplified.

Figure 10:
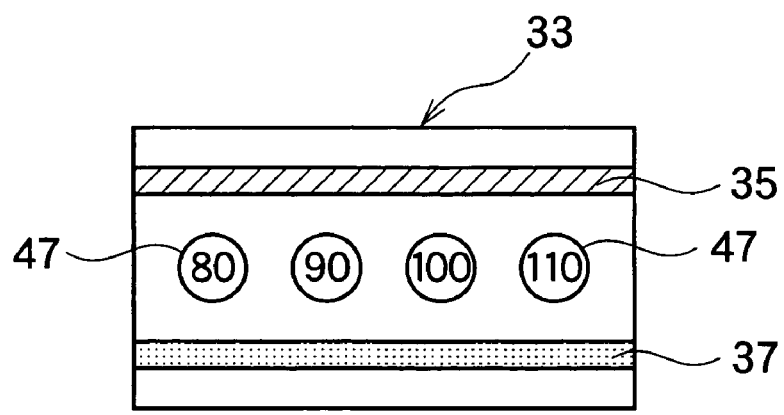
FIG. 10 is a sectional view of an adhesive tape for leakage detection according to a third embodiment of the present invention.

The adhesive tape 33 may be further provided with temperature sensors 47 including dyes which irreversibly change colors when the temperature reaches a predetermined value, as shown in FIG. 10. Preferably, the dyes of the temperature sensors 47, respectively, have independent temperatures for changing colors. For example, one changes its color at 80° C., another at 90° C., and the other at 100° C.

The adhesive tape 33 provided with the temperature sensors 47 may be adhered on certain places in the electronic equipment main body 1 so that abnormal temperature increase as well as the fluid leakage can be detected. In a case where any abnormality, such as resin deformation, which is caused by such an abnormal temperature, happens, the temperature sensors 47 teach the abnormal temperature. Those who check the temperature sensors 47 may estimate a cause of the abnormality, such as leaving the electronic equipment main body 1 in a hot car cabin and abnormal temperature increase of the fuel cell. He or she may judge whether the fuel cell or the resin therein should be changed.

Figure 11:
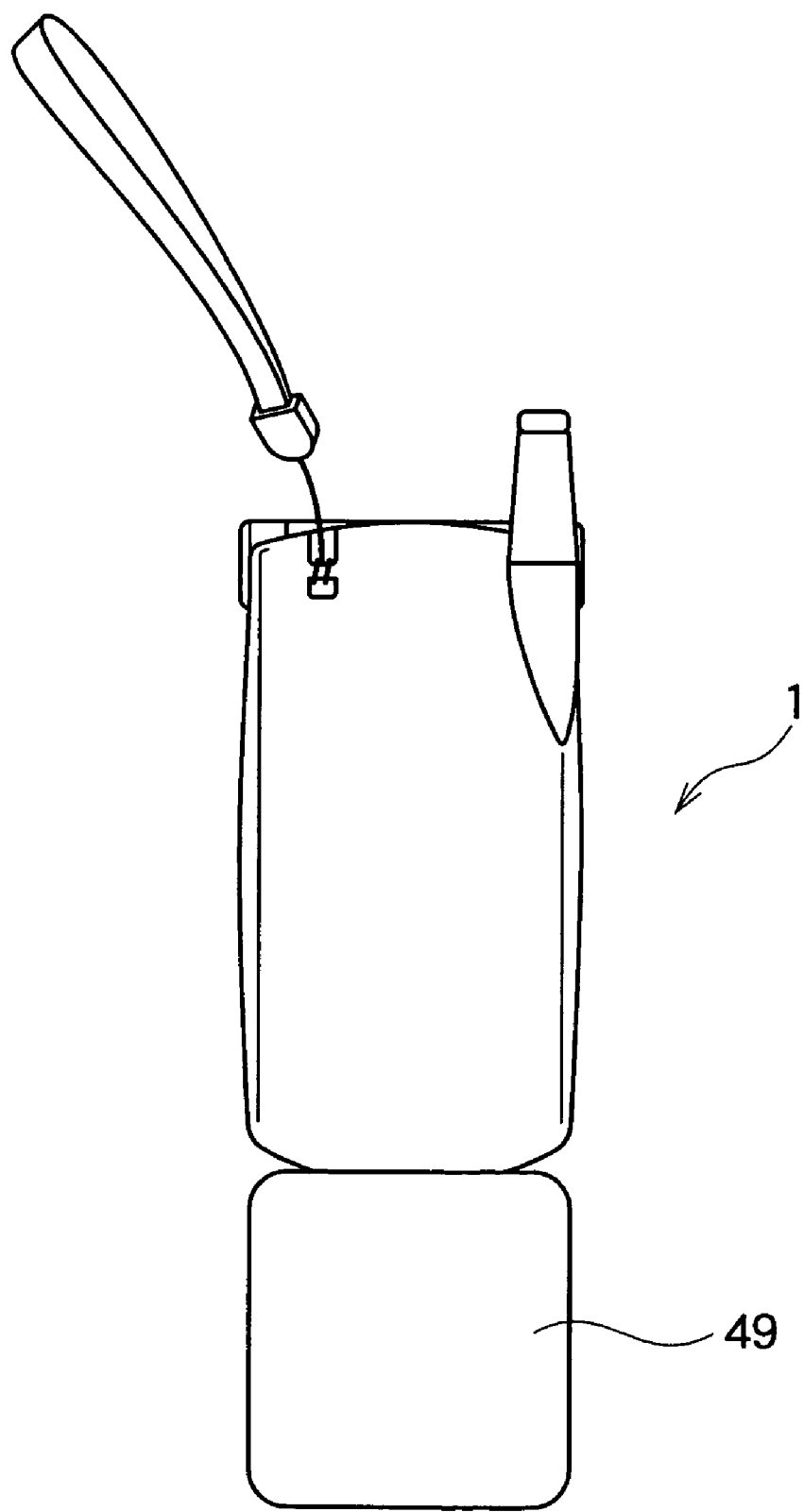
FIG. 11 is a rear view of a cellular phone as another example of the electronic equipment, to which a fuel cell unit is attached.
Figure 12:
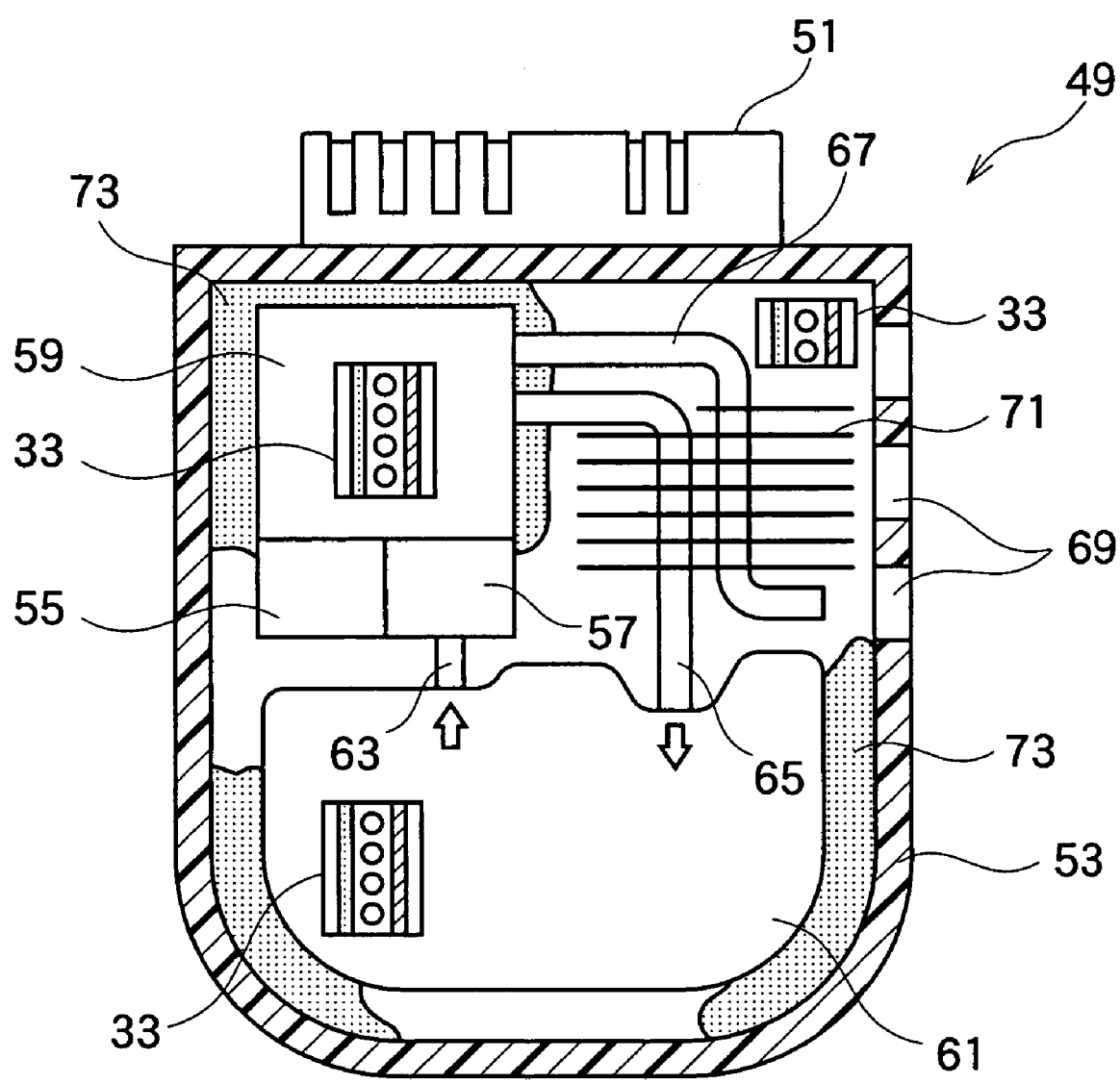
FIG. 12 is a partial sectional view of a fuel cell unit to which the adhesive tape is attached.

In the above description, the electronic equipment main body 1 houses the fuel cell as the power source thereof, however, the electronic equipment main body 1 can be operated with an external fuel cell unit 49, which is detachably attached to the electronic equipment main body 1, as shown in FIG. 11. The fuel cell unit 49 is preferably constituted as shown in FIG. 12.

The fuel cell unit 49 is provided with a casing 53 and a connector 51 for connection with the electronic equipment main body 1. The casing 53 houses a fuel cell 59, an air supply pump 55, a fuel supply pump 57 and a fuel tank 61 filled with a liquid fuel. The fuel supply pump 57 is connected with the fuel tank 61 via a connection pipe 63.

The fuel cell 59 is connected with the fuel tank 61 via a recovery pipe 65 for recovery of an unreacted fuel and such. An exhaust pipe 67 for exhaust from the fuel cell 59, through which water vapor generated by the fuel cell reaction and spent air are exhausted, is further provided. An end of the exhaust pipe 67 is disposed in the vicinity of one of openings 69 of the casing 53. The recovery pipe 65 and the exhaust pipe 67 are provided with heat radiation fins 71.

A porous filler 73, such as a sponge, is filled around the fuel cell 59 and the fuel tank 61. Plural adhesive tapes 33 are adhered on places, where the fluid leakage would be detected, of the fuel cell 59, the fuel tank 61 and the inside of the casing 53.

The fuel cell 59 generates electric power by means of reaction between the fuel supplied by the fuel supply pump 57 from the fuel tank 61 and the air supplied by the air supply pump 55. Reaction products, such as water vapor and spent air, are exhausted through the exhaust pipe 67 to the outside of the casing 53. Unreacted matters, such as unreacted fuel are retrieved via the recovery pipe 65 to the fuel tank 61.

In a case where water intrudes into the casing 53 and/or the fuel leaks from the fuel tank 61, the fuel cell 59 or the pipes, the water intrusion or the fluid leakage as well as an approximate location thereof can be detected by means of the adhesive tapes 33. Additionally, abnormal high-temperatures can be detected by means of the adhesive tapes 33.

Provided that only one of the adhesive tapes 33, which is adhered on the fuel cell 59, indicated color change, it could be judged that the temperature increase of the fuel cell 59 caused the abnormal high-temperature. Meanwhile, in a case where all the adhesive tapes 33 indicated color change, this situation means that the whole of the casing 53 was in a high-temperature environment, for example, the casing 53 might be left in a car cabin during fine weather.

Furthermore, provided that the fuel cell unit 49 falls on the ground, the fuel cell 59 and the fuel tank 61 are protected from impact because the porous filler 73 is filled therearound.

According to the aforementioned constitution, the air supply pump 55 supplies internal air in the casing 53 to the fuel cell 59, however, the air supply pump 55 maybe so configured as to supply the outside air to the fuel cell 59 and the end of the exhaust pipe 67 may be projected outward from the casing 53. Furthermore, the fuel tank 61 may be disposed in the outside of the casing 53 so that the fuel tank 61 is replaceable.

As being understood from the above description, the present embodiment of the present invention enables detection of the fluid leakage from the fluid device distinguishably from the water intrusion from the outside. Furthermore, in a case where the electronic equipment has a problem caused by abnormal high-temperature, it can be judged whether the problem comes from heat generation of the electronic equipment per se or the external environment.

Although the invention has been described above by reference to certain embodiments of the invention, the invention is not limited to the embodiments described above. Modifications and variations of the embodiments described above will occur to those skilled in the art, in light of the above teachings.

What is claimed is:

1. An electronic equipment comprising:
    a main body;
    a fluid device using fluid including an additive, the fluid device being attached to the main body; and
    a detection part configured to contain leaked fluid to make the leaked fluid visible with the additive and disposed on the fluid device whereby leakage of the fluid is detected, wherein
    the detection part comprises a first detecting substance detecting water and a second detecting substance detecting alcohol, whereby intrusion of water and the leakage of the fluid is distinguishably detected.

2. The electronic equipment of claim 1, wherein the detection part comprises an adhesive tape.

3. The electronic equipment of claim 1, wherein the first detecting substance comprises water-soluble ink and the second detecting substance comprises alcohol-soluble ink.

4. The electronic equipment of claim 1, wherein the second detecting substance comprises one or more materials selected from the group of: styrene resin, polyolefin resin, polyurethane rubber, polyurethane resin, acrylic rubber and acrylic resin.

* * * * *